F. B. SEIBERLICH.

BOTTLE WASHING MACHINE.

No. 10,327. Reissued May 15, 1883.

Witnesses:

S. N. Piper

E. B. Pratt

Inventor:

Frank Benj. Seiberlich.

by R. H. Eddy, att'y.

UNITED STATES PATENT OFFICE.

FRANK B. SEIBERLICH, OF EAST CAMBRIDGE, MASSACHUSETTS.

BOTTLE-WASHING MACHINE.

SPECIFICATION forming part of Reissued Letters Patent No. 10,327, dated May 15, 1883.

Original No. 272,484, dated February 20, 1883. Application for reissue filed April 17, 1883.

*To all whom it may concern:*

Be it known that I, FRANK BENJAMIN SEIBERLICH, of East Cambridge, in the county of Middlesex, of the State of Massachusetts, have invented a new and useful Improvement in Machines for Washing Bottles; and I do hereby declare the same to be described in the following specification and represented in the accompanying drawings, of which—

Figure 1:
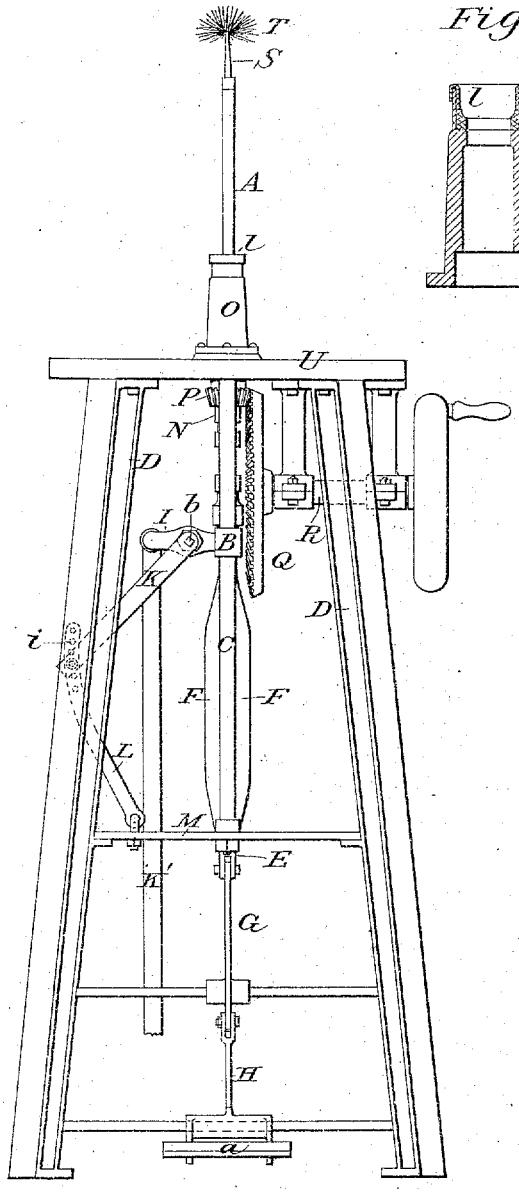
Figure 2:
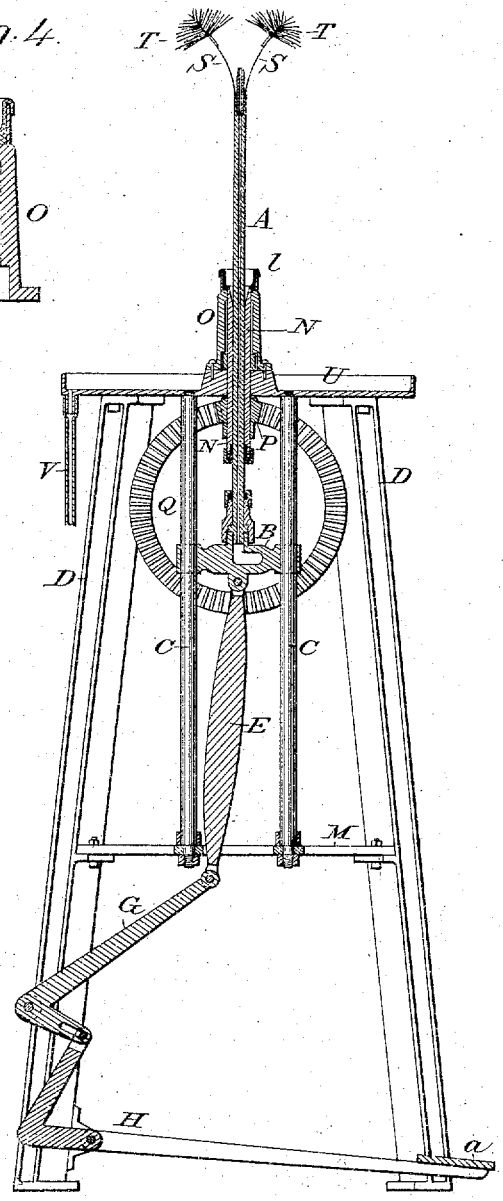

Figure 1 is a side elevation of a bottle-washing machine embodying my invention. Fig. 2 is a transverse section of such machine, it being taken in a plane at right angles with the plane of elevation of Fig. 1. The remaining figures are hereinafter described.

This invention relates to bottle-washers of the class of which that described in United States Patent No. 241,834 is a representative, the nature of such invention being defined in the claims hereinafter presented.

Figure 3:
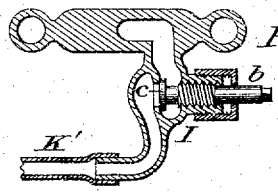

In Figs. 1 and 2 of the said drawings, A is a jet-tube, connected with a vertically-movable cross-head, B, arranged to slide on two stationary upright rods or guides, C C, they being fixed to and disposed within a table, D. Jointed to the said cross-head is a connecting-rod, E, having weights F fixed to its opposite sides, they being sufficient to depress the cross-head and jet-tube as occasion may require. The said connecting-rod, at its lower end, is jointed to the longer arm of a knee-lever, G, fulcrumed to the table, and having its shorter arm jointed to that of another knee-lever, H, also fulcrumed to the table, this latter lever having its longer arm forked and provided with a step, *a*, to enable it (the said lever) to be used as a pedal. The said longer arm is so made, or open, in order to allow that of the other knee-lever to pass down through it while the pedal-lever is being raised and the other lever depressed with the weighted connection-rod. On forcing the pedal-lever longer arm down the longer arm of the other lever will be forced upward and thereby cause, by means of the weighted connection-rod, the jet-pipe to rise upward. The said jet-pipe is to be joined to the cross-head, so as to be capable of being revolved independently of it, and is to open into it, the cross-head being hollow or chambered and provided with a stop-cock, I, such being particularly shown on an enlarged scale in Fig. 3, which is a horizontal section of the cross-head and stop-cock. A hose, K′, joined to the induct of the stop-cock, is to lead water under pressure into and through the stop-cock, from whence, when the valve of such cock is open, such water will flow into and through and out of the jet-tube.

Figure 4:
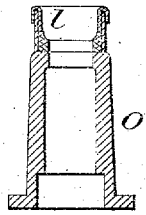

The spindle *b* of the valve *c* of the stop-cock is keyed to an arm, K. The spindle screws into the body of the cock, so that by moving the arm the right way the valve will be moved off its seat, in order for the water to be discharged by the jet tube or pipe. For operating the valve or turning its stem, two arms, K and L, are used, the lower one, L, being hinged to a shelf, M, of the table, and provided with a range of holes, (shown at *i*,) to enable it to be pivoted to the lower part of the upper arm, K. While the cross-head is being depressed the valve will be closed, so as to shut off the water from the jet-pipe, and such valve will be opened during a rise of the cross-head and the jet-pipe. The said jet-pipe slides freely within a tubular shaft, N, duly supported so as to revolve within the table, the two shafts being adapted so that the tubular shaft, while revolving, shall not move endwise, but revolve the jet-tube, which can slide up and down in the tubular shaft, the connection of the jet-tube and the tubular shaft being by what is termed a "spline" or "feather" connection. Encompassing the tubular shaft is a tubular and stationary post, O, socketed at its upper part to receive the head of the neck of a bottle to be washed. The socket should be lined or cushioned with india-rubber, in order to prevent breakage of the bottles at the necks thereof while being inserted in the socket, such lining or cushion being shown at *l* in Fig. 4, which is a vertical section, on an enlarged scale, of the post and its lining. Fixed on the tubular shaft is a bevel-pinion, P, which engages with a bevel-gear, Q, carried by a cranked shaft, R, all being arranged as represented. On revolving the shaft R the tubular shaft and the jet-tube will be rapidly revolved.

Projecting from the jet-tube at its upper part are a series of springs, S S, each of which is provided with a brush, T. The top U of the table is dished and furnished with an educt, V, to carry off the waste water that may fall within such top.

The cranked shaft for revolving the tubular shaft by means of bevel-gears, as explained, is arranged at right angles to the plane of the cross-head and its weighted connection-rod and the two knee-levers. This enables an attendant with his left foot on the pedal or lower of the said levers readily to seize with his right hand and turn the crank of such shaft, it being understood that this machine is to be operated by manual power only.

The jet-tube being depressed to its lowest position, a bottle, inverted, is to be inserted into the socket of the post, so as to cause the brushes to pass into the neck of such bottle. The pedal is next to be depressed and the shaft R to be revolved, in which case the jet-tube and the brushes will be forced upward into and will be rapidly revolved within the bottle, water at the same time flowing through the jet-tube and being discharged into the bottle, whereby such bottle will be washed or cleansed. On an attendant raising his foot on the pedal the weighted connection-rod will depress the jet-tube and the stop-cock will be closed.

I would remark that I make no claim to the machine or any part of it as described or claimed in the aforesaid Patent No. 241,834.

I claim in the machine for washing bottles—

1. The weighted connection-rod and the two knee-levers, combined and arranged with the table and the supporting cross-head of the jet-tube, substantially and to operate as set forth.

2. The arms K L, combined and arranged substantially as described, with the table, the stop-cock, and the cross-head and jet-tube provided with means for operating them, as set forth.

3. The combination of the cranked shaft and bevel-gears for revolving the tubular shaft with the operating-levers, connection-rod, and cross-head, as described, arranged in a plane at right angles to the axis of the said cranked shaft and applied to the table and the jet-tube, substantially as set forth.

FRANK BENJAMIN SEIBERLICH.

Witnesses:
R. H. EDDY,
E. B. PRATT.